(12) United States Patent
Kakishita et al.

(10) Patent No.: US 7,068,214 B2
(45) Date of Patent: Jun. 27, 2006

(54) RADAR

(75) Inventors: Etsuo Kakishita, Hyogo (JP);
Kimihisa Yoneda, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 7 days.

(21) Appl. No.: 10/779,665

(22) Filed: Feb. 18, 2004

(65) Prior Publication Data

US 2004/0222918 A1 Nov. 11, 2004

(30) Foreign Application Priority Data

Feb. 19, 2003 (JP) ............................. 2003-041665

(51) Int. Cl.
| G01S 13/10 | (2006.01) |
| G01S 13/08 | (2006.01) |
| G01S 13/93 | (2006.01) |
| G01S 17/10 | (2006.01) |
| G01S 17/08 | (2006.01) |

(52) U.S. Cl. .................. 342/134; 342/70; 342/118; 342/135; 342/175; 342/195; 701/300; 701/301; 356/4.01; 356/5.01

(58) Field of Classification Search ............ 342/70–72, 342/89–103, 118–146, 175, 194–197, 27, 342/28; 367/87, 99; 180/167–169; 701/300, 701/301; 356/4.01–5.15
See application file for complete search history.

(56) References Cited

U.S. PATENT DOCUMENTS

| 3,594,795 | A | * | 7/1971 | Thor et al. .................. 342/132 |
| 3,618,089 | A | * | 11/1971 | Moran, Jr. .................. 342/125 |
| 4,125,835 | A | * | 11/1978 | Barry .......................... 342/94 |
| 4,203,112 | A | * | 5/1980 | Wocher et al. ............. 342/135 |
| 4,620,788 | A | * | 11/1986 | Giger .......................... 342/135 |
| 4,630,226 | A | * | 12/1986 | Tanaka ........................ 367/99 |
| 5,075,878 | A | * | 12/1991 | Ohtomo et al. ............. 342/127 |
| 5,102,220 | A | * | 4/1992 | Tiedeke ....................... 342/135 |
| 5,126,746 | A | * | 6/1992 | Gritton ....................... 342/125 |
| 5,609,059 | A | * | 3/1997 | McEwan ..................... 342/124 |
| 5,726,742 | A | * | 3/1998 | Nourrcier ................... 342/135 |
| 6,232,910 | B1 | * | 5/2001 | Bell et al. ..................... 342/70 |
| 6,333,710 | B1 | * | 12/2001 | Reiche et al. .............. 342/118 |
| 6,535,161 | B1 | * | 3/2003 | McEwan ..................... 342/124 |
| 6,587,187 | B1 | * | 7/2003 | Watanabe et al. ........... 342/118 |

FOREIGN PATENT DOCUMENTS

| EP | 0142733 | A2 | * | 5/1985 |
| FR | 2692363 | A1 | * | 12/1993 |
| GB | 2262341 | A | * | 6/1993 |
| JP | U 5-28983 | | | 4/1993 |

* cited by examiner

Primary Examiner—Bernarr E. Gregory
(74) Attorney, Agent, or Firm—Oliff & Berridge, PLC (57) ABSTRACT

A transmission wave is transmitted to a target from a transmission section. A receiving section receives a wave reflected from the target as a received wave. A conversion section converts a time difference between the transmission time at which a transmission wave is transmitted and the receiving time at which a received wave is received in to a voltage. The thus-obtained voltage is subjected to analog-to-digital conversion by means of a processing circuit, whereby a distance is computed.

6 Claims, 9 Drawing Sheets

RADAR

BACKGROUND OF THE INVENTION

1. Field of the Invention

The present invention relates to a radar, and more particularly, to a radar which emits a transmission wave, such as a radio wave or light, to a target, receives a wave reflected from the target, and computes a distance between the radar and the target from a time difference.

2. Description of the Related Art

Figure 13:
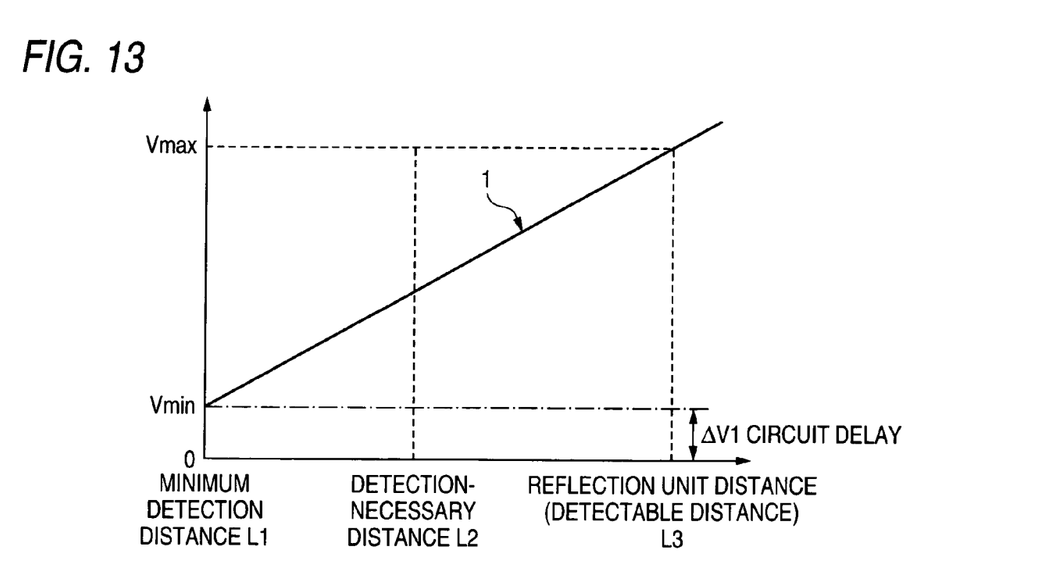
FIG. 13 is a view for describing operation of a typical related-art radar.

FIG. 13 is a view for describing operation of a typical radar in the related art. On the occasion of detection of a distance from the position of a radar to a target; e.g., a vehicle such as an automobile, a voltage level is obtained along with a conversion characteristic which varies in the form of a straight line within a range from L3 to L1 and is indicated by a line 1 shown in FIG. 13, provided that L3 designates a reflection limit distance which can be detected by the radar; e.g., 60 m, and that L1 designates a minimum detection distance L1; e.g., 0.5 m. The voltage obtained at the detectable distance L3 is Vmax, and a voltage obtained in accordance with the minimum detection distance L1 is Vmin. A voltage ΔV1 is a voltage corresponding to a delay time pertaining to the operation of an electric circuit from the time a transmission wave is emitted until a received wave is output. The voltage obtained within the range from Vmin to Vmax is subjected to analog-to-digital conversion (abbreviated as A/D), thereby detecting a distance.

Figure 14:
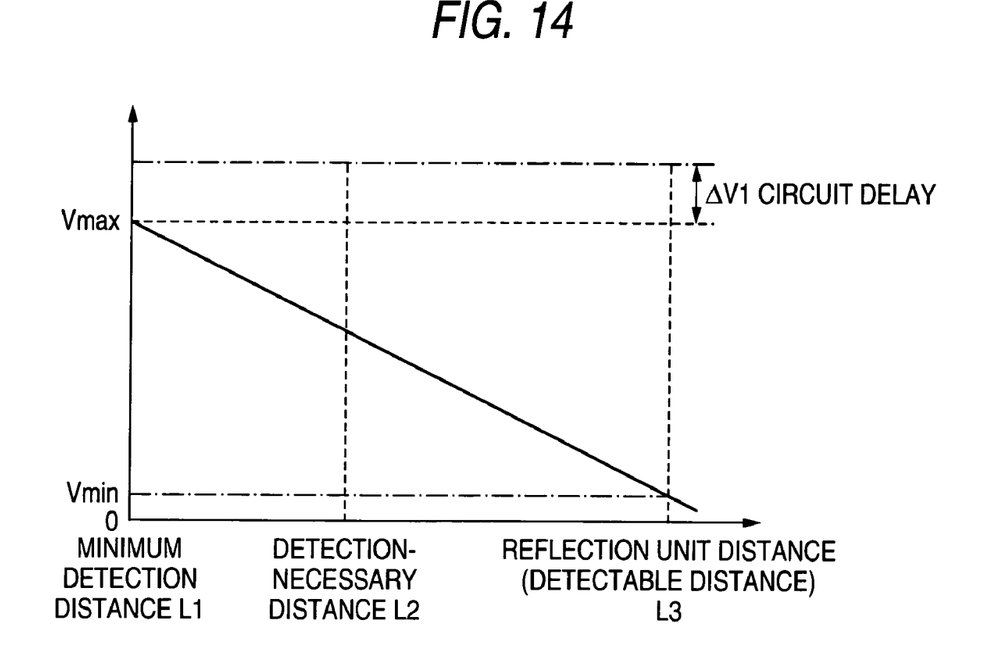
FIG. 14 is a view for describing operation of another related-art radar.

FIG. 14 is a view showing a conversion characteristic of another radar in the related art. The related art shown in FIG. 14 is analogous that shown in FIG. 13. According to the related art shown in FIG. 13, a corresponding voltage increases with an increase in the distance to the target. However, the related art shown in FIG. 14 has a conversion characteristic such that a corresponding voltage decreases from the maximum voltage Vmax that has been decreased by the voltage ΔV1 as the distance to the target becomes greater.

In any of the related-art techniques shown in FIGS. 13 and 14, the voltage Vmin to Vmax corresponding to the time difference is expressed as a linear function of distance over a comparatively wide range of distance from the minimum detection distance L1 to the reflection limit distance L3. Accordingly, there arises a problem of low resolving power within the range of distance from the minimum detection distance L1, which is most frequently required, to a detection-necessary distance L2 (e.g., 10 to 20 m), which is a required distance; e.g., a distance required at the time of controlling of the vehicle's brake. In these related-art techniques, the voltage—which is obtained in accordance with the time difference and represented by the longitudinal axis shown in FIGS. 13 and 14—includes the voltage ΔV1 corresponding to a delay period pertaining to the operation of the electric circuit. This also results in narrowing of the range of the voltage Vmin to Vmax used for detecting a distance, and consequently the resolving power of a distance falls further.

The related-art techniques serving as the background of the present invention are described in JP-UM-A-5-28983.

SUMMARY OF THE INVENTION

An object of the invention is to provide a radar arranged so as to be able to improve resolving power of a distance.

The present invention is directed toward a radar including: a transmission section for transmitting a transmission wave; a receiving section for receiving, as a received wave, a wave reflected from a target; a conversion section for converting, into an electric signal level, a time difference existing between a time at which the transmission wave is transmitted and a time at which the received wave is received; and a computation section for computing a distance to the target on the basis of the electrical signal level output from the conversion section, wherein settings are made such that a portion of a conversion characteristic of the conversion section having a small time difference becomes larger than a portion of the conversion characteristic of the conversion section having a large time difference, in terms of a change in the electrical signal level corresponding to the time difference.

According to the present invention, in the radar for measuring a distance corresponding to a time difference W1 between the time at which the transmission wave is transmitted and the time at which the received wave is received, on the occasion of conversion of the time difference W1 into the level of an electrical signal; e.g., a voltage or an electric current, a portion of the conversion characteristic of the conversion section involving a small time difference is set so as to become larger than a portion of the conversion characteristic of the conversion section involving a large time difference in terms of a change in the level of an electrical signal corresponding to the time difference. For instance, a predetermined first detection distance; e.g., a minimum detection distance, is designated by L1, and a longer predetermined second detection distance; e.g., a detection-necessary distance, is designated by L2. Within a first range S12 in which a time difference between L1 and L2 is small, rates of changes R1, R1a in the level of the electrical signal corresponding to a time difference W1 are set to large values. Therefore, within the range S12, the resolving power of a distance can be increased. Within a second range S23 which goes beyond the detection-necessary distance L2, is less frequently used, and has a large time difference, rates of changes R2, R2a are set to small values. As a result, the range in which the level of the electrical signal belonging to the first range S12 can be used is increased, thereby enabling an attempt to enhance resolving power.

The level of the thus-obtained electrical signal is converted into a digital value at uniform intervals through use of, e.g., an analog-to-digital converter, thereby computing a distance to the target. Thus, there is implemented a radar which enhances resolving power of a distance within the first range S12 from the minimum detection distance L1, which has a high degree of importance and is frequently used, to the detection-necessary distance L2. Therefore, the amount of change in the level of the electrical signal corresponding to the first range S12 is maximized, to thereby enhance the resolving power of a distance.

The present invention is also characterized in that the portion being larger than a predetermined first time difference is set such that a change becomes saturated.

According to the present invention, the conversion characteristic may be taken as one which has a tendency toward setting a distance longer than the detection-necessary distance L2, which corresponds to a portion larger than the predetermined first time difference, to a saturation level and taking the distance as a constant value; e.g., R2=0. However, the conversion characteristic may be configured to have a property such that the rates of variations R1a, R2a change continually and non-linearly.

The present invention is also characterized in that the first time difference is a time difference corresponding to a distance required to render a determination as to whether or not a safety device provided on a vehicle is to be activated.

According to the present invention, when the distance to the object to be computed by the computation section has become shorter and decreased below a predetermined value within the range S12—which is less than a predetermined distance (e.g., 10 to 20 m) at which passengers of a vehicle must be protected from damage, such as collision, by means of activating a safety device—the safety device operates. The safety device may be, for instance, air bag units disposed in front of a driver's seat and a passenger seat for preventing collision of the passengers, or seat belt units for restraining the passengers in their seats. In any case, in response to a start up signal, the safety device performs operation for protecting passengers, thereby preventing infliction of damage on the passengers, which would otherwise be caused as a result of collision of a vehicle. The first time difference is a time difference at which the thus-computed distance corresponds to the distance required to render a determination as to whether or not the safety device is to be activated. The first time difference is set to a time difference corresponding to the predetermined distance so that a time difference can be obtained with high accuracy within the foregoing range. Consequently, the passengers of the vehicle are reliably protected by the safety device.

The present invention is further characterized in that the conversion section converts, into an electrical signal level, a time difference determined by subtracting a lag time of an electrical circuit including at least one of the transmission section and the receiving section from a time difference between a transmission time at which a transmission wave is transmitted and a receiving time at which a received wave is received.

According to the present invention, a delay time $\Delta W1$ pertaining to operation of an electrical circuit of either the transmission section or the receiving section or electrical circuits of both section is subtracted from the time difference W1 between the time at which the transmission wave is transmitted and the time at which the received wave is received, thereby determining a value W2. The level of the electrical signal corresponding to the thus-obtained value W2; that is, a voltage or an electrical current, is obtained. There is maximized a value—at which the level of the electrical signal corresponding to the time difference can change within the first range S12 from the minimum detection distance L1 to the detection-needed distance L2—thereby enhancing resolving power of a distance. A conversion characteristic for converting the value W2 obtained by subtraction into the level of the electrical signal may be such that the rate of a change remains constant over the entire range of the level of an electrical signal such as a convertible voltage of a distance computation section; e.g., an analog-to-digital converter. Preferably, as mentioned previously, the rates of changes R1, R1a are set to have values within the fist range S12 from the minimum detection range L1 to the detection-necessary distance L2. Within the second range S23 beyond the detection-necessary distance L2, the rates of changes R2, R2a are set to small values, whereby the resolving power of a distance can be enhanced to a much greater extent.

The present invention is also characterized in that the conversion section determines the lag time from a wraparound component which is received by the receiving section directly from the transmission section.

According to the present invention, the foregoing delay time is determined from a wraparound component formed as a result of the signal transmitted from the transmission section being received directly by the receiving section without being reflected from the target. Specifically, the delay time is set to a predetermined time which is longer than a period of time between the transmission time at which the transmission wave is transmitted and the receiving time at which the receiving section receives a wraparound component. Thus, an adverse effect of the wraparound component is prevented, and the resolving power of a distance can be enhanced by increasing the magnitude of changes in the level of the electrical signal within the first range S12.

The present invention is also directed toward a radar including: a transmission section for transmitting a transmission wave; a receiving section for receiving, as a received wave, a wave reflected from a target; a conversion section for converting, into an electric signal level, a time difference existing between a time at which the transmission wave is transmitted and a time at which the received wave is received; and a computation section for computing a distance to the target on the basis of the electrical signal level output from the conversion section, wherein the conversion section converts, into an electrical signal level, a time difference determined by subtracting a lag time of an electrical circuit including at least one of the transmission section and the receiving section from the time difference between the transmission time at which the transmission wave is transmitted and the receiving time at which the received wave is received.

According to the present invention, the level of the electrical signal is converted such that the level is increased or decreased with an increase in the time difference W1 existing between the transmission time at which the transmission wave is transmitted and the receiving time at which the received wave is received. The thus-converted level of the electrical signal is converted into a digital value by the distance computation section at respective electrical signal levels of uniform intervals, thereby detecting a distance.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
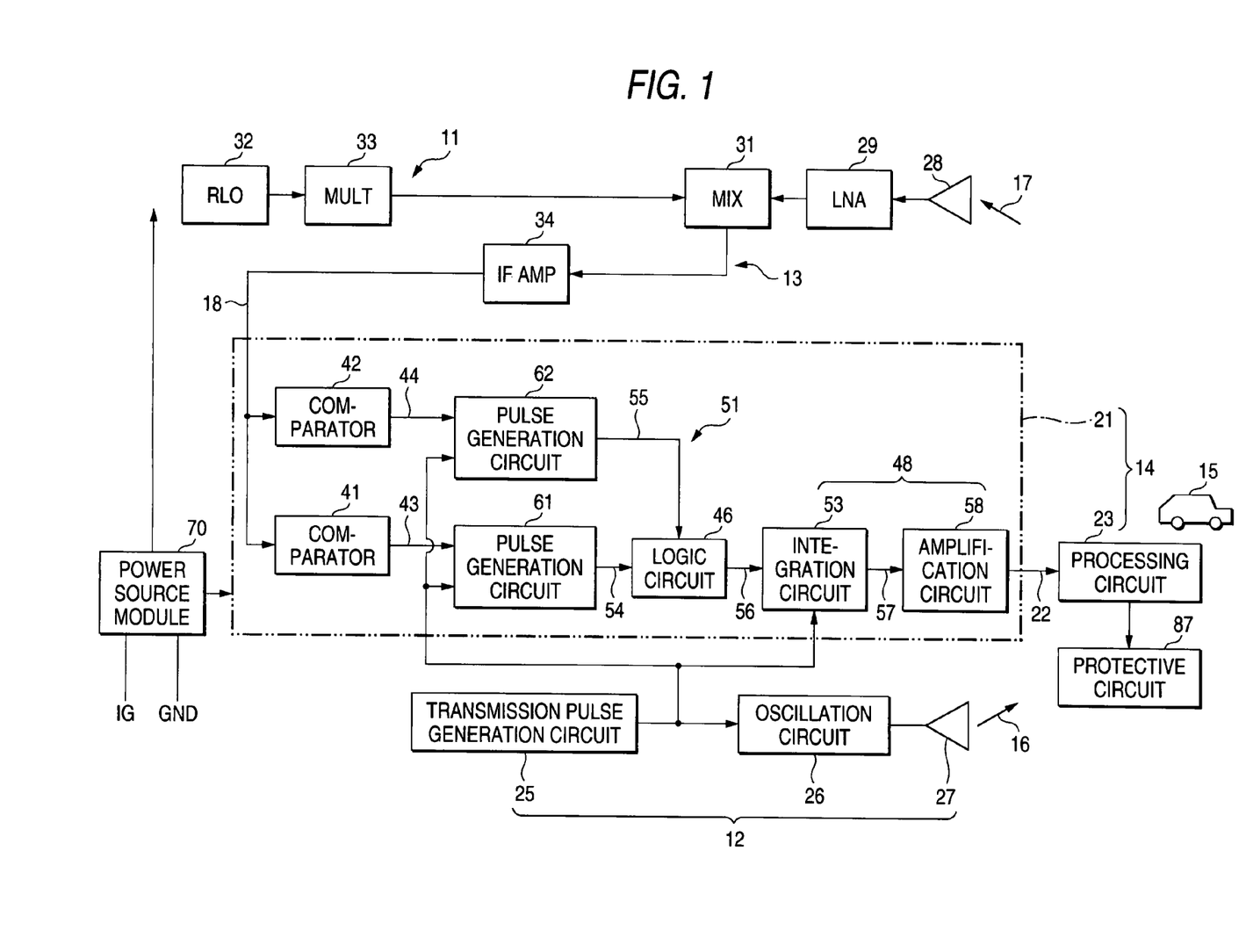
FIG. 1 is a block diagram showing the overall configuration of a radar 11 according to an embodiment of the invention.

FIG. 1 is a block diagram showing the overall configuration of a radar 11 according to an embodiment of the invention. This radar is mounted on a vehicle, such as an automobile, and basically includes a transmission section 12, a receiving section 13, and a distance detection section 14. The transmission section 12 emits a transmission wave 16 forward. A wave 17 reflected by a target 15 (e.g., an automobile) is received by the receiving section 13, and a line 18 outputs the wave as a received wave. The distance detection section 14 includes a conversion section 21 and a processing circuit 23. The conversion section 21 converts a time difference W1 between the transmission time at which the transmission wave is transmitted and the receiving time at which the received wave is received into the level of an electrical signal; e.g., a voltage in the embodiment, through use of a predetermined conversion characteristic. A signal having a voltage corresponding to the time difference W1; that is, a distance between the radar 1 of the present embodiment and the target 15, is output from a line 22. At predetermined intervals the processing circuit 23, acting as a distance computation section, responds to the voltage output from the line 22 and converts the given voltage into a digital value, to thus perform an analog-to-digital conversion. The time difference W1; that is, a distance corresponding to the voltage, is determined through computation.

Figure 2:
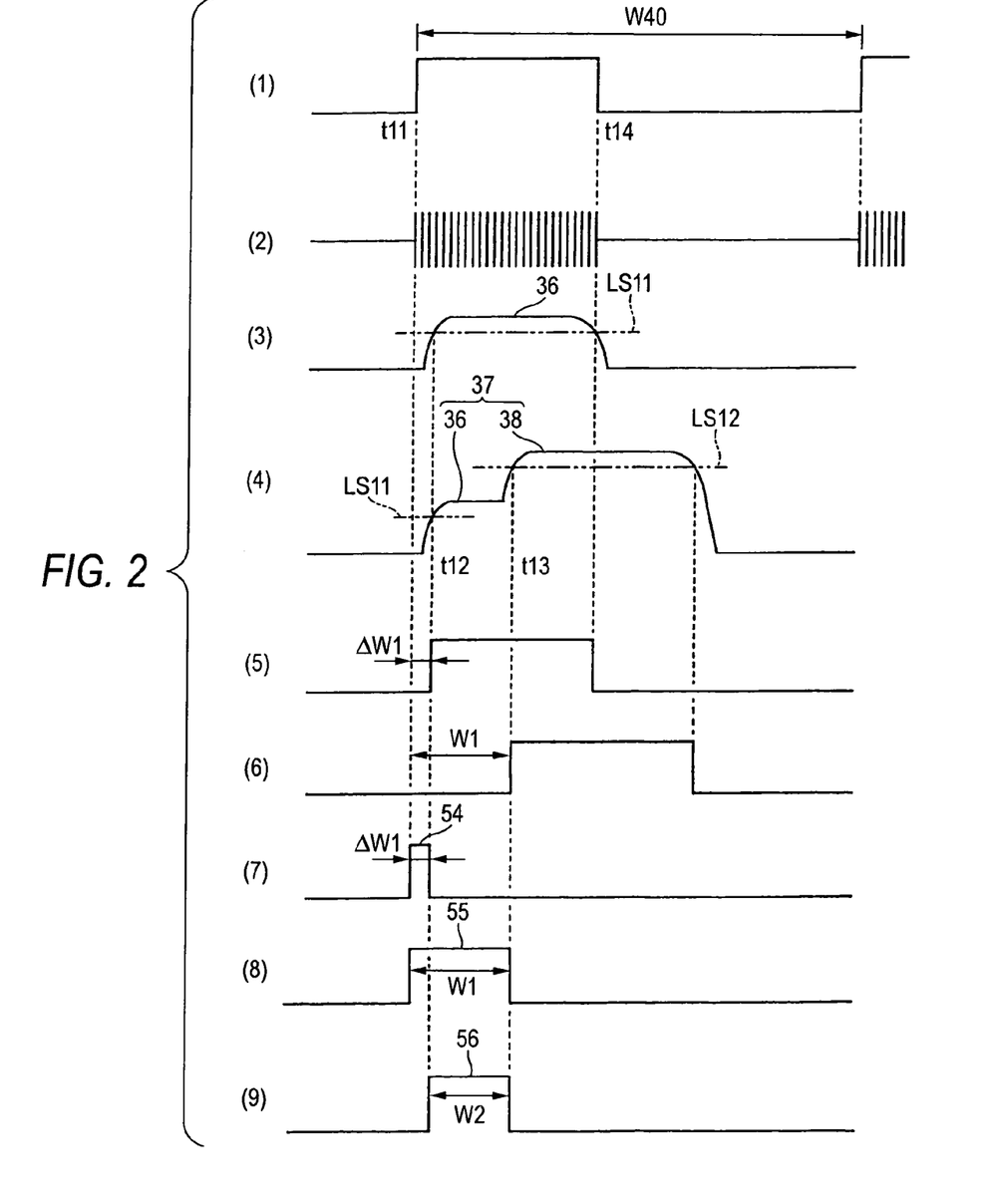
FIG. 2 is a waveform diagram for describing operation of the radar 11 shown in FIG. 1.

FIG. 2 is a waveform diagram for describing operation of the radar 11 shown in FIG. 1. A transmission pulse generation circuit 25 of the transmission section 12 repeatedly generates, at a given cycle W40, a transmission pulse which enters one level; that is, a high level, for a duration from time t11 to time t14 shown in FIG. 2-1 and enters another level; that is, a low level, for the remaining period of time. An oscillation circuit 26 responds to a transmission pulse and generates an electromagnetic wave of, e.g., 24 GHz, shown in FIG. 2-2 for only a period during which the transmission pulse remains high. The electromagnetic wave is transmitted to a transmission antenna 27, whereby the transmission wave 16 is emitted forward. The transmission wave 16 maybe an electromagnetic wave, a radio wave, or light such as a laser beam.

The receiving section 13 has a receiving antenna 28, and the receiving antenna 28 receives the reflected wave 17 resulting from the transmission wave 16 having been reflected from the target 15. The thus-received reflected wave is amplified by an amplification circuit 29 and then delivered to a mixing circuit 31. A local oscillation signal output from a local oscillation circuit 32 is delivered to the mixing circuit 31 after having been multiplied by a multiplication circuit 33. An intermediate frequency signal having a beat frequency output from the mixing circuit 31 is amplified by an intermediate frequency circuit 34. Thus, a configuration for a super heterodyne receiving scheme is embodied.

An output from the amplification circuit 34 is led from the line 18 as a received wave, as mentioned previously, and delivered to the conversion section 21.

FIG. 2-3 shows the waveform of the received wave led from the line 18 when the target 15 is not present in front of the antennas 16, 17. When the target 15 is not present, a received wave 36 shown in FIG. 2-3 has a comparatively low voltage. The received wave 36 is produced by a high frequency component which wraps around from, e.g., the transmission antenna 27, directly to the receiving antenna 28.

When the target 15 is present ahead, the received wave led to the line 18 has a waveform of a received wave 37 shown in FIG. 2-4. This received wave 37 includes the previously-described received wave 36 which is received as a result of the transmission wave emitted toward the target 15 having wrapped around to the receiving antenna 28 from time t11 and has a comparatively-low level; and a received wave 38 which is generated from the reflected wave 17 originating from the target 15 and has a comparatively high level.

The conversion section 21 of the distance detection section 14 has two comparators 41, 42 for receiving the received wave delivered by way of the line 18. A discrimination level serving as a determination threshold of the comparator 41 is set to LS11 shown in FIG. 2-4, and a discrimination level serving as a determination threshold of the comparator 42 is set to LS12 shown in FIG. 2-4 (where LS11<LS12). As a result, the comparator 41 leads a received pulse signal shown in FIG. 2-5 to a line 43. The other comparator 42 leads a received pulse signal shown in FIG. 2-6 to a line 44. The received pulse signal led to the line 43 by the comparator 41 has a waveform with a leading edge, the edge being delayed from time t11 by only a delay time $\Delta W1$ and rising at time t12. The delay time $\Delta W1$ is a time stemming from a delay in the operation of an electrical circuit including the transmission section 12 and the receiving section 13 after the transmission pulse 25 has generated a transmission pulse at time t11 shown in FIG. 2-1. The comparators 41, 42 act as delay time signal generation circuits which generate a signal representing the delay time $\Delta W1$.

As shown in FIG. 2-6, the received pulse signal led to the line 44 by the comparator 42 has a leading edge which rises at time t13, the time having deviated from time t11, which corresponds to the distance between the radar 11 of the present embodiment and the target 15, by time W1, the received pulse signal led to the lines 43, 44 by the comparators 41, 42 is delivered to pulse generation circuits 61, 62 included in a pulse generation section 51. A logic circuit 46 constituting a subtraction circuit of the pulse generation circuit 51 is given the pulses, which are delivered by way of lines 54, 55, from the pulse generation circuits 61, 62. The pulse generation circuits 61, 62 are further imparted with transmission pulses from the transmission pulse generation circuit 25. The pulse generation circuit 61 responds to the received pulse signal, which is delivered by way of the line 43, from the comparator 41 and the transmission pulses output from the transmission pulse generation circuit 25, thereby producing a pulse 54 having the delay time $\Delta W1$ shown in FIG. 2-7. The other pulse generation circuit 62 responds to a received pulse signal, which is delivered by way of the line 44, from the comparator 42 and the transmission pulse output from the transmission pulse generation circuit 25, thereby producing a pulse 55 having the time difference W1 shown in FIG. 2-8. For convenience of comprehension, the line of the electrical signal and that of the signal waveform are sometimes assigned the same reference numeral.

The logic circuit 46 has a subtraction function and subtracts the delay time ΔW1 of the pulse 54 from the time difference W1 output from the pulse generation circuit 62. There is produced a time difference signal 56 which sustains the pulse at a high level for only a period of time W2 (=W1−ΔW1) which has been determined by subtraction and is shown in FIG. 2-9, and the time difference signal 56 is delivered to an integration circuit 53 constituting a conversion circuit 48. the conversion circuit 48 further includes an amplification circuit 58 which receives an integral output from the integration circuit 53 by way of a line 57. The integration circuit 53 imparts the pulse 56, which has been produced by subtraction of the pulses 54, 55 and is shown in FIG. 2-9, from the line 57 to the amplification circuit 58, which has a predetermined conversion characteristic, by means of generating a voltage which increases proportionally with lapse of time. A power supply circuit 70 supplies power to the radar 11.

Figure 3:
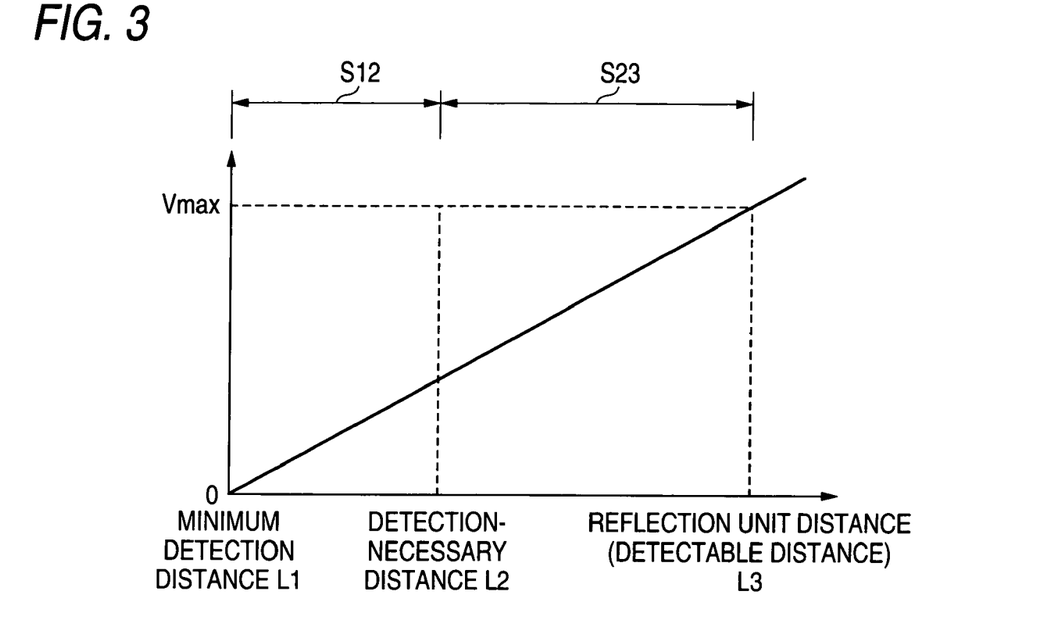
FIG. 3 is a view for describing operation of an integration circuit 53 included in a pulse generation section 51.

FIG. 3 is a view for describing the operation of the integration circuit 53 included in the pulse generation section 51. The integration circuit 53 has a characteristic which is directly proportional with lapse of time, generates a voltage as shown in FIG. 3, is reset by the leading edge of the transmission pulse, and initiates counting operation.

Figure 4:
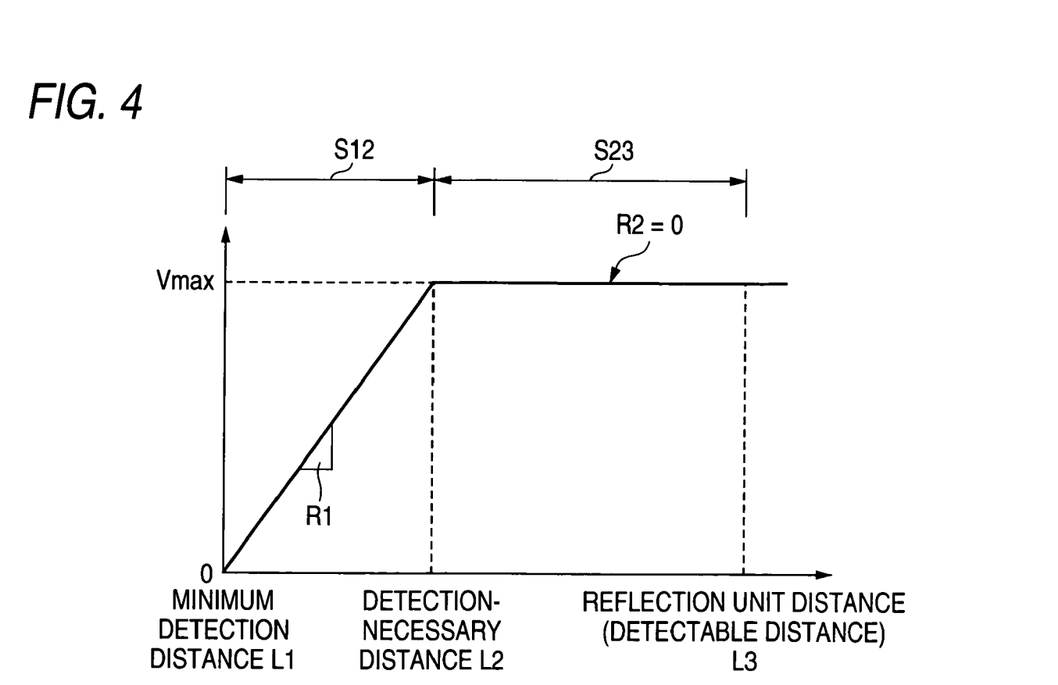
FIG. 4 is a view showing a conversion characteristic of an amplification circuit 58 contained in the pulse generation section 51.

FIG. 4 is a view showing a conversion characteristic of the amplification circuit 58 included in the pulse generation section 51. Within a first range S12 of the time difference W1, which corresponds to a predetermined minimum detection distance L1 and a predetermined detection-necessary distance L2, the amplification circuit 58 is set to a large value with a given proportional constant determined by a rate of change R1 corresponding to the time difference W1. Within a second range S23 of the time difference W1, which exceeds the detection-necessary distance L2, a rate of change R2 is set to a small value (R1>R2), and R2=0 in the present embodiment. Thus, within the first range S12, the rate of change R1 increases linearly; for instance, such that the rate of change proportionally increases with a voltage ΔV1 corresponding to the delay time ΔW1 being set to zero. Within the second range S23, the level of the electrical signal is maintained at a saturated value Vmax. Specifically, a portion of the conversion characteristic of the amplification circuit 58 shown in FIG. 4, the portion being larger than a predetermined first time difference; that is, a portion corresponding to the distance longer than the detection-needed distance L2, is set such that a variation in the level of the electrical signal, which is a voltage, becomes saturated.

The processing circuit 23 subjects the voltage, which corresponds to a distance determined through computation, to a predetermined voltage discrimination level corresponding to a predetermined distance which is equal to or less than the distance L2 within the first range S12. When the distance determined through computation is equal to or less than the voltage discrimination level, a start up signal is delivered to a protective device 87, thereby activating the protective device 87. The predetermined first time difference is set to a time difference corresponding to a distance required to render a determination as to whether or not a safety device mounted on a vehicle equipped with the radar 11 is to be activated. The voltage discrimination level V9 is a predetermined value which is equal to or less than the voltage Vmax corresponding to the distance L2. The protective device 87 may be, e.g., airbag units or seat belt units, and protects passengers by preventing infliction of damage to the passengers, which would otherwise be caused as a result of collision of the vehicle.

Figure 5:
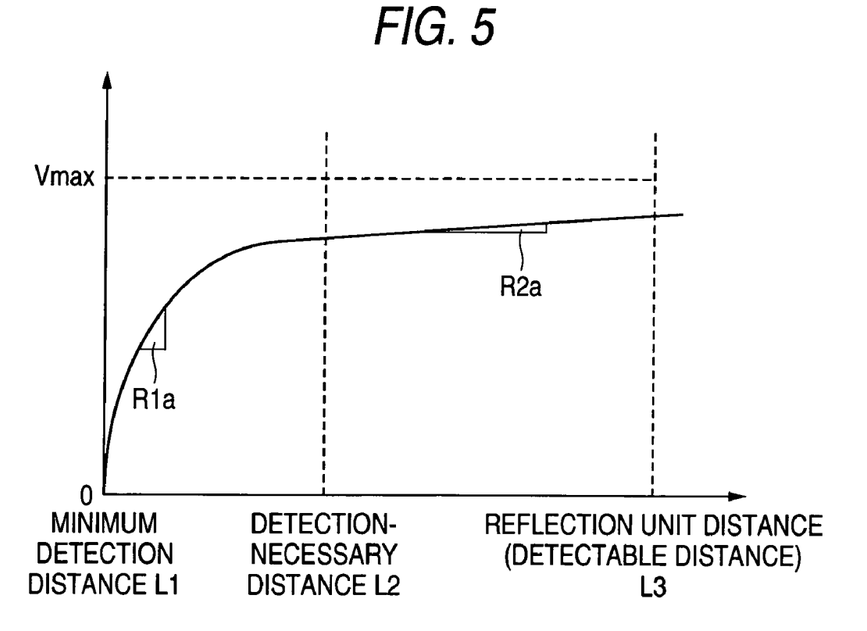
FIG. 5 is a view showing a conversion characteristic of the amplification circuit 58 according to another embodiment of the invention.

FIG. 5 is a view showing the conversion characteristic of the amplification circuit 58 according to another embodiment of the present invention. In this embodiment, the respective rates of changes R1a, R2a are set so as to become continuously smooth in accordance with the time difference W1 from the first range S12 to the second range S23 (R1a>R2a).

The amplification circuit 58 having the conversion characteristic shown in FIG. 4 or that shown in FIG. 5 is utilized over the entire range of a voltage from 0 to the value Vmax corresponding to the time difference W1. Particularly, within the first range S12, the rates of changes R1, R1a are set to values which are larger than the rates of changes R2, R2a within the second range S23, thereby enhancing the resolving power of a distance within the first range S12. Thus, highly accurate measurement of a distance becomes possible.

Figure 6:
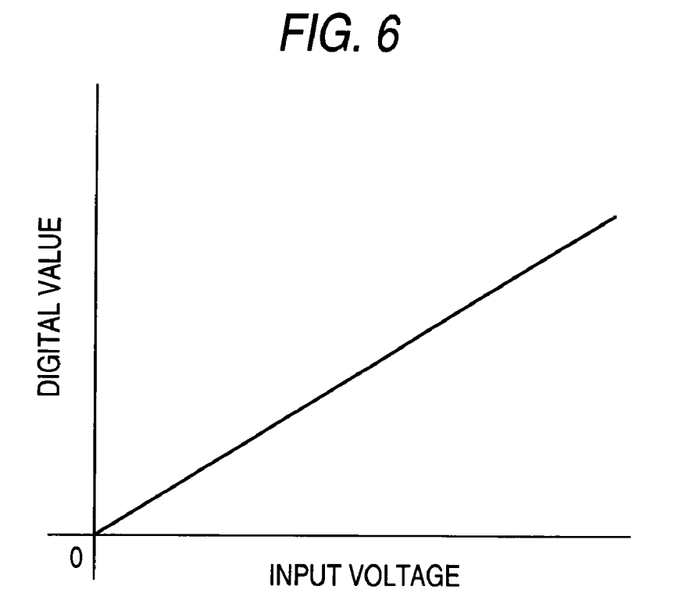
FIG. 6 is a view for describing an analog-to-digital conversion function of a processing circuit 23.

FIG. 6 is a view for describing an analog-to-digital conversion function of the processing circuit 23. In correspondence to the voltage output from the amplification circuit 58 by way of the line 22, the digital value has resolving power for producing an output at uniform intervals of an input voltage. Specifically, the processing circuit 23 is given an output from the amplification circuit 58 by way of the line 22 and has an analog-to-digital conversion function for converting the voltage, which is delivered by way of the line 22, into a binary digital signal at uniform intervals over the range from 0 voltage to the voltage Vmax. Thus, high resolving power for detecting a distance can be attained within the first range S12.

Figure 7:
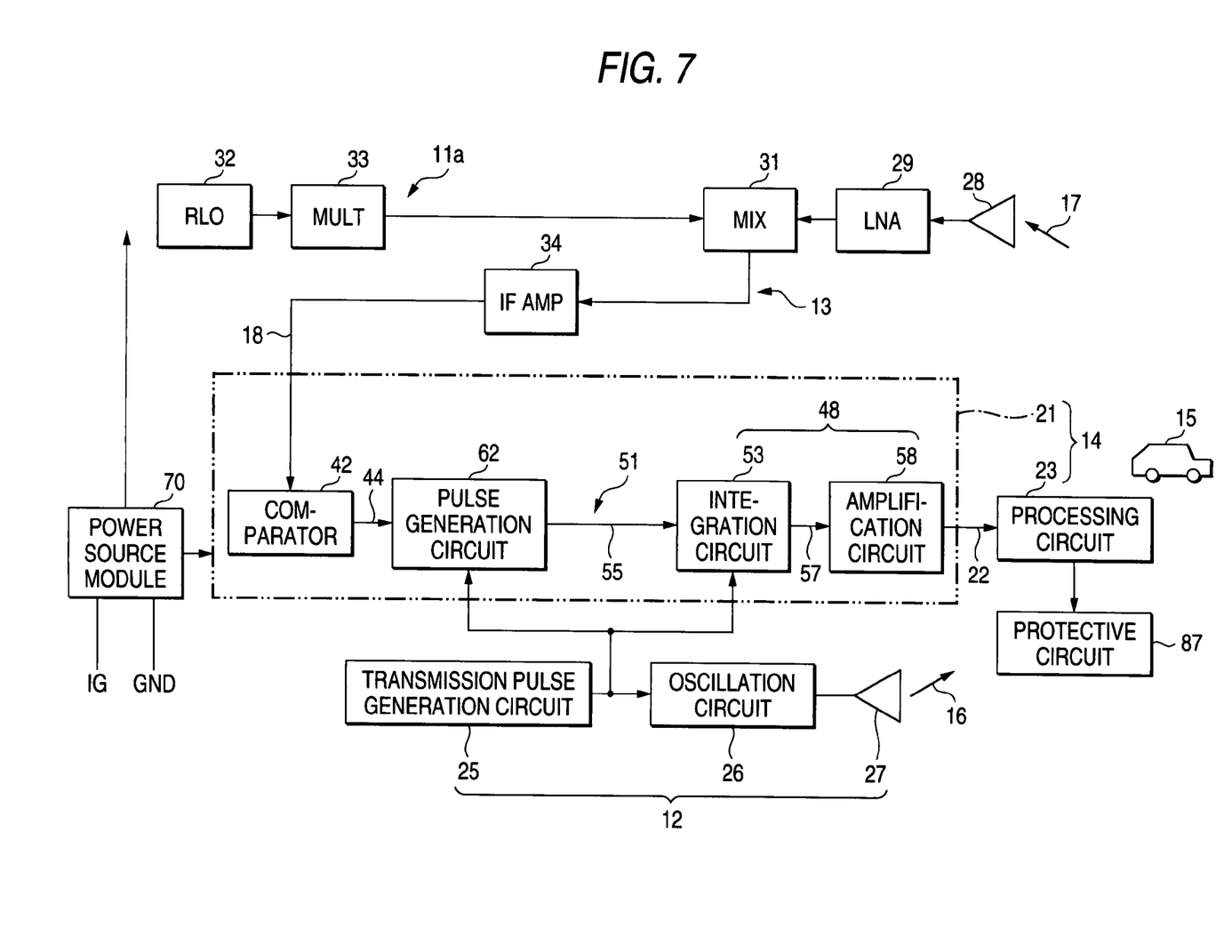
FIG. 7 is a block diagram of a radar 11a according to another embodiment of the invention.

FIG. 7 is a block diagram of a radar 11a according to another embodiment of the present invention. This embodiment is analogous to that shown in FIGS. 1 through 6, and corresponding features are assigned the same reference numerals. It is noteworthy that the comparator 41, the pulse generation circuit 61 in the pulse generation section 51, and the logic circuit 46 constituting the subtraction circuit are omitted from this embodiment. The pulse generation section 51 is constituted of one pulse generation circuit 62. Therefore, in the embodiment shown in FIG. 7, the voltage ΔV1 shown in association with FIG. 3-1 is included in the signal led from the line 22 of the pulse generation section 51.

Figure 8:
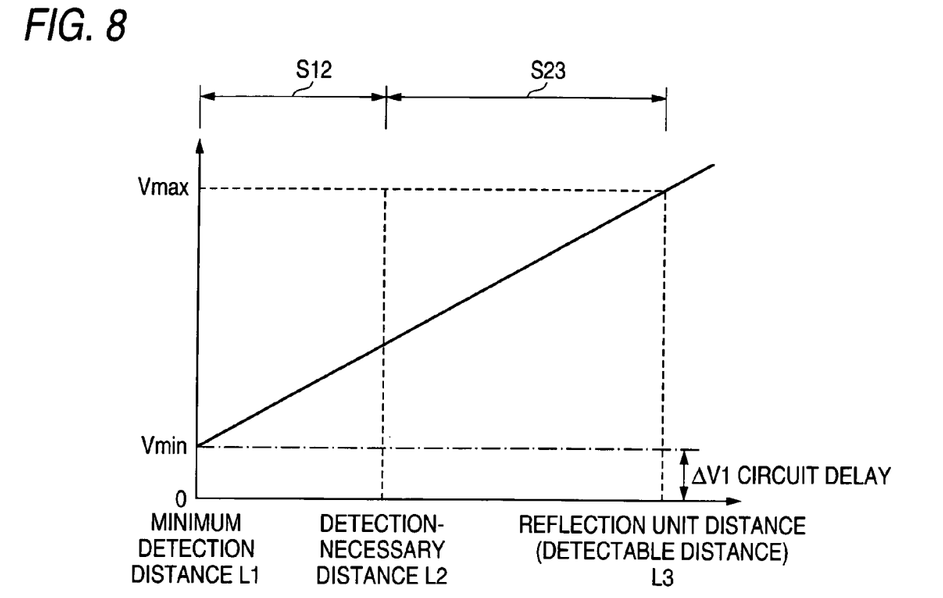
FIG. 8 is a view for describing operation of an integration circuit 53 included in a conversion circuit 48 shown in FIG. 7.

FIG. 8 is a view for describing operation of the integration circuit 53 included in the conversion circuit 48 shown in FIG. 7. In the embodiment shown in FIG. 7, the pulse 55 given to the integration circuit 53 includes the previously-described voltage ΔV1. Therefore, the voltage Vmin corresponding to the minimum detection distance L1 includes the voltage ΔV1. Within the range of the voltage Vmin to Vmax, an integral voltage corresponding to the time difference W1; that is, the minimum detection distance L1 to the distance L3, is obtained.

Figure 9:
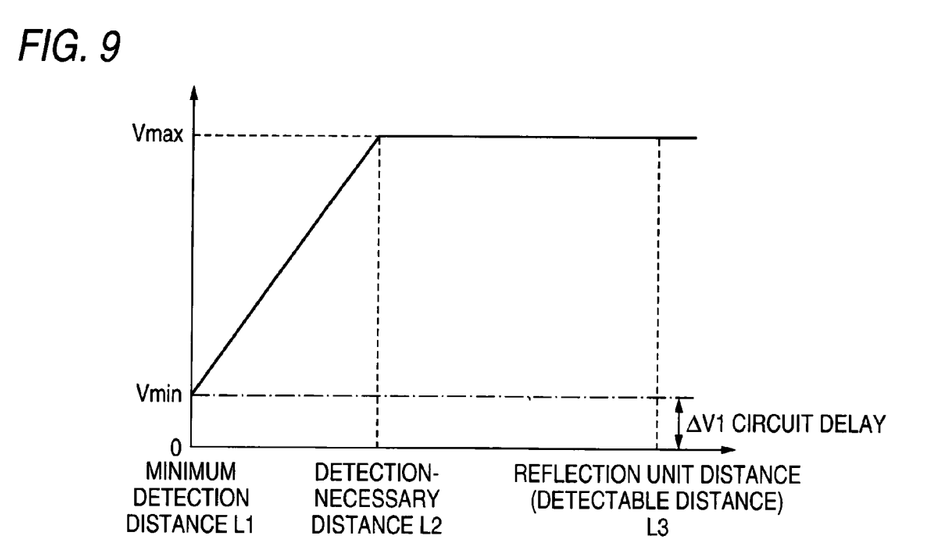
FIG. 9 is a view showing a conversion characteristic of the amplification circuit 58 included in the conversion circuit 48 shown in FIG. 7.

FIG. 9 is a view showing the conversion characteristic of the amplification circuit 58 included in the conversion circuit 48 shown in FIG. 7. The pulse led to the line 22 of the pulse generation section 51 has the delay time ΔW1, and an integral output including the voltage ΔV1 is imparted from the integration circuit 53 to the amplification circuit 58.

Figure 10:
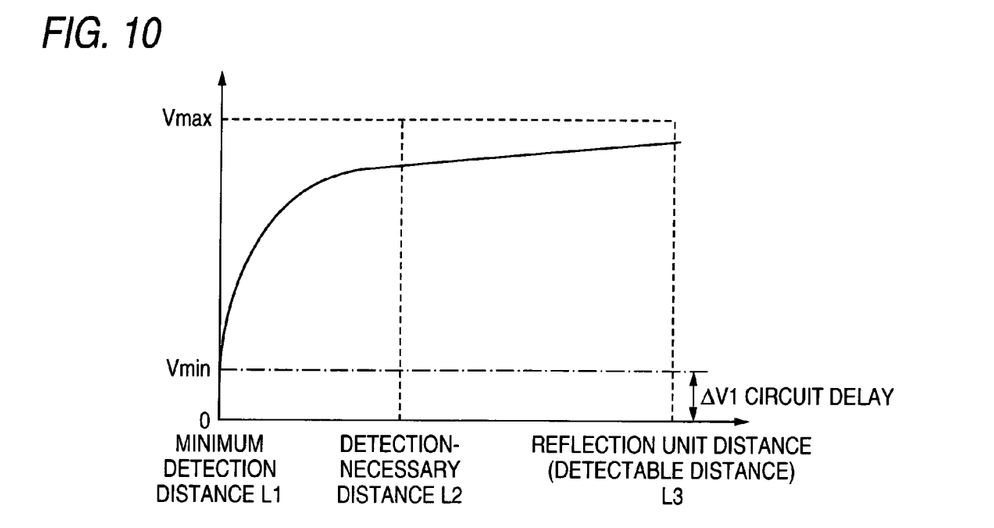
FIG. 10 is a view showing a conversion characteristic of yet another embodiment of the present invention in place of the amplification circuit shown in FIG. 7.

FIG. 10 is a view showing a conversion characteristic of yet another embodiment of the present invention in place of the amplification circuit 58 shown in FIG. 7. The conversion characteristic shown in FIG. 10 is analogous to that shown in FIG. 5. However, particularly in the embodiment shown in FIG. 10, the pulse generation section 51 has the time difference ΔW1, and an integral output including the voltage ΔV1 is correspondingly imparted from the integration circuit 53 to the amplification circuit 58 by way of the line 57. In other respects, the embodiment shown in FIG. 10 is analogous to the embodiments shown in FIGS. 7 and 8 in terms of configuration and operation.

Figure 11:
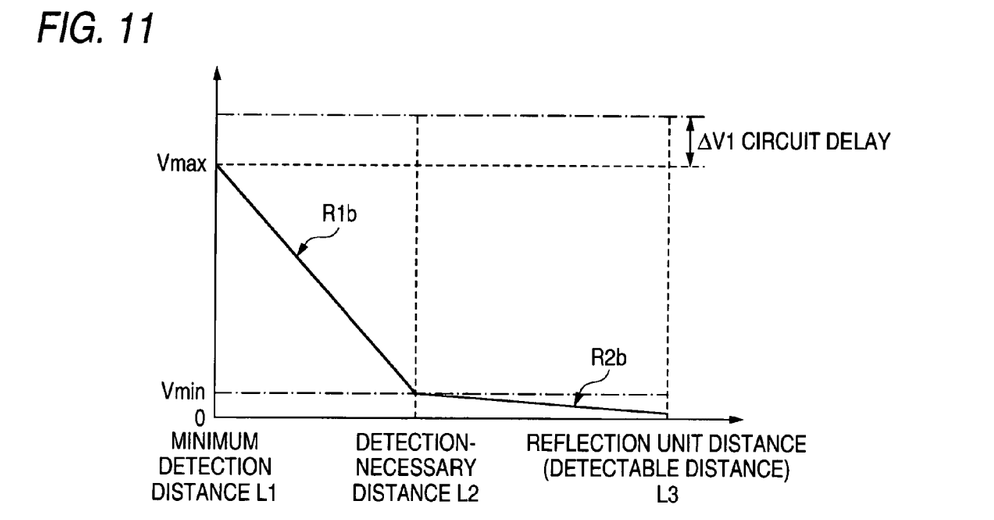
FIG. 11 is a view for describing operation of the amplification circuit 58 according to yet another embodiment of the present invention.

FIG. 11 is a view for describing operation of the amplification circuit 58 according to still another embodiment of the invention. The embodiment shown in FIG. 11 is analogous to that described in connection with FIGS. 7 and 8. However, a noteworthy difference is that, in the present embodiment, the amplification circuit 58 has an amplifying characteristic which decreases with lapse of time. The amplification circuit 58 has a great rate of change R1$b$ within the first range S12 in the same manner as in the previous embodiment and a small rate of change R2$b$ within the second range S23.

Figure 12:
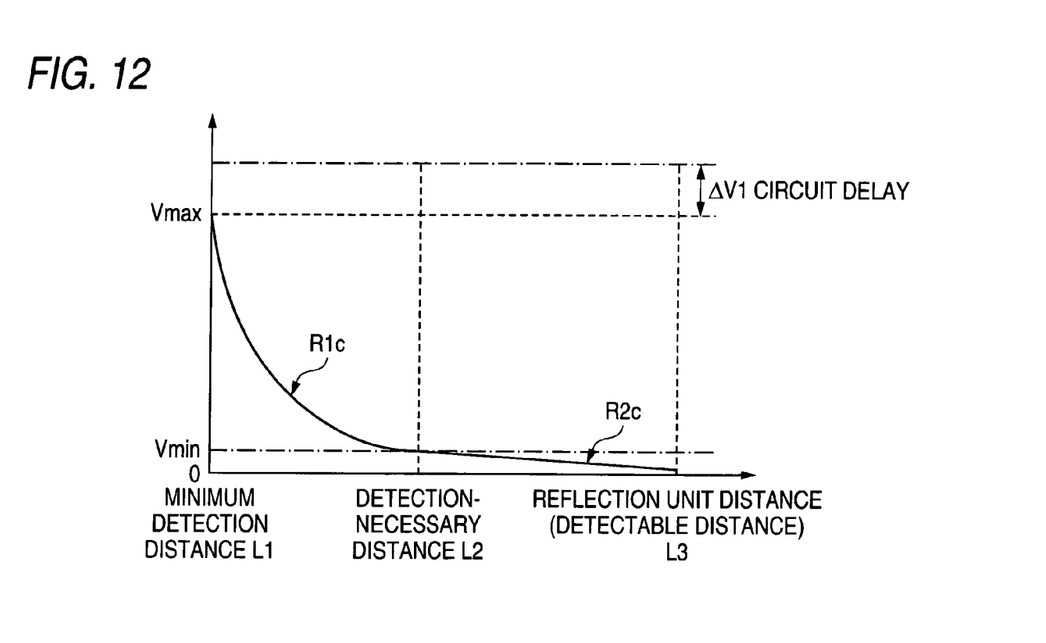
FIG. 12 is a view for describing operation of the amplification circuit 58 according still another embodiment of the present invention.

FIG. 12 is a view for describing operation of the amplification circuit 58 according to yet another embodiment of the present invention. The present embodiment is analogous to that described in connection with FIG. 10. However, a noteworthy difference is that, in the present embodiment, the amplification circuit 58 has an amplified output which decreases with lapse of time. The amplifying circuit 58 has a great rate of change R1$c$ within the first range S12 and a small rate of change R2$c$ within the second range S23. In other respects, the embodiment shown in FIG. 12 is analogous to that shown in FIG. 9 in terms of operation and configuration.

According to the present invention, a portion of a conversion characteristic of a conversion section having a small time difference becomes larger than a portion of the conversion characteristic of the conversion section having a large time difference, in terms of a change in the electrical signal level corresponding to the time difference. For instance, in the previously-described embodiments, the rates of changes R1, R1$a$ in the level of an electrical signal corresponding to a time difference W1 between the transmission time at which a transmission wave is transmitted and the receiving time at which a received wave is received are set to large values within a first range S12 from a first detection distance L1 to a second detection distance L2. As a result, a voltage usable range within the first range S12 is maximized, thereby enhancing resolving power of a distance. A delay time ΔW1 in operation of the electrical circuit containing at least one of the transmission section and the receiving section is subtracted from the time difference W1, thereby determining a value W2. The value is then converted into the level of the electrical signal, thereby enhancing the resolving power of a distance.

What is claimed is:

1. A radar, comprising:
a transmission section that transmits a transmission wave;
a receiving section that receives, as a received wave, a wave reflected from a target;
a conversion section that converts, into an electric signal level, a time difference existing between a time at which the transmission wave is transmitted and a time at which the received wave is received; and
a computation section that computes a distance to the target on the basis of the electrical signal level output from the conversion section, wherein
the conversion section performs conversion based on a conversion characteristic defined so that a change in the electrical signal level of a portion of the conversion characteristic having a small time difference becomes larger than a change in the electrical signal level of a portion of the conversion characteristic having a large time difference.

2. The radar according to claim 1, wherein
a portion of the conversion characteristic of the conversion section, the portion being larger than a predetermined first time difference, is set such that a change becomes saturated.

3. The radar according to claim 2, wherein
the first time difference is a time difference corresponding to a distance required to render a determination as to whether or not a safety device provided on a vehicle is to be activated.

4. The radar according to claim 1, wherein
the conversion section converts, into an electrical signal level, a time difference determined by subtracting a lag time of an electrical circuit including at least one of the transmission section and the receiving section from the time difference between the transmission time at which the transmission wave is transmitted and the receiving time at which the received wave is received.

5. The radar according to claim 4, wherein
the conversion section determines the lag time from a wraparound component which is received by the receiving section directly from the transmission section.

6. A radar, comprising:
a transmission section that transmits a transmission wave;
a receiving section that receives, as a received wave, a wave reflected from a target;
a conversion section that converts into an electrical signal level, a time difference determined by subtracting a lag time of an electrical circuit from a time difference between the transmission time at which the transmission wave is transmitted and a receiving time at which the received wave is received, the electrical circuit including at least one of the transmission section and the receiving section; and
a computation section that computes a distance to the target on the basis of the electrical signal level output from the conversion section.

* * * * *